US011966957B2

(12) United States Patent
Faricy et al.

(10) Patent No.: US 11,966,957 B2
(45) Date of Patent: Apr. 23, 2024

(54) METHODS AND SYSTEMS FOR MODULAR PERSONALIZATION CENTER

(71) Applicant: XGenesis Inc., Clearwater, FL (US)

(72) Inventors: Francis Faricy, Dunedin, FL (US); Jason Robert Clements, Clearwater, FL (US)

(73) Assignee: XGenesis Inc., Clearwater, FL (US)

( * ) Notice: Subject to any disclaimer, the term of this patent is extended or adjusted under 35 U.S.C. 154(b) by 168 days.

(21) Appl. No.: 17/517,899

(22) Filed: Nov. 3, 2021

(65) Prior Publication Data

US 2022/0148059 A1  May 12, 2022

Related U.S. Application Data

(60) Provisional application No. 63/110,518, filed on Nov. 6, 2020.

(51) Int. Cl.
  *G06Q 30/00*  (2023.01)
  *G06Q 30/0601*  (2023.01)
  *G06F 3/04842*  (2022.01)
  *G06F 3/04847*  (2022.01)

(52) U.S. Cl.
  CPC ..... *G06Q 30/0621* (2013.01); *G06Q 30/0631* (2013.01); *G06Q 30/0641* (2013.01); *G06F 3/04842* (2013.01); *G06F 3/04847* (2013.01)

(58) Field of Classification Search
  None
  See application file for complete search history.

(56) References Cited

U.S. PATENT DOCUMENTS

| | | | |
|---|---|---|---|
| 7,103,642 B1 | 9/2006 | Chen et al. | |
| 10,740,660 B2* | 8/2020 | Bhardwaj | G06V 10/50 |
| 10,891,143 B2* | 1/2021 | Smith | G06F 16/2291 |
| 11,030,574 B1* | 6/2021 | Grande | G06N 3/08 |
| 11,126,849 B2* | 9/2021 | Zheng | G06N 20/00 |
| 11,474,688 B2* | 10/2022 | Kim | G06V 30/32 |
| 11,538,083 B2* | 12/2022 | Sewak | G06Q 30/0643 |
| 11,562,418 B2* | 1/2023 | Tang | G06Q 30/0643 |
| 11,593,553 B1* | 2/2023 | Greiner | G06N 20/00 |

(Continued)

FOREIGN PATENT DOCUMENTS

WO   WO-2022098698 A1   5/2022

OTHER PUBLICATIONS

Mark Milankovich "Examples of Personalized Recommendations in eCommerce" Aug. 23, 2018. Retrieved from https://medium.com/@markmilankovich/examples-of-personalized-recommendations-in-ecommerce-57c126a0edb2 (Year: 2018).*

(Continued)

*Primary Examiner* — Naeem U Haq
(74) *Attorney, Agent, or Firm* — Wilson Sonsini Goodrich & Rosati

(57) ABSTRACT

The present disclosure provides a system for providing personalization for a target website. The system comprises: an artificial intelligence (AI) engine including one or more machine learning algorithm trained models for providing one or more personalization features; and a personalization module configured for integrating the one or more personalization features into the target website, wherein the one or more personalization features are rendered within a popup widget displayed over the target website.

20 Claims, 11 Drawing Sheets

(56) References Cited

U.S. PATENT DOCUMENTS

| | | | |
|---|---|---|---|
| 11,700,266 B2* | 7/2023 | Silverstein | G06F 16/9562 726/1 |
| 2009/0327863 A1 | 12/2009 | Holt et al. | |
| 2013/0191215 A1 | 7/2013 | Metcalf | |
| 2015/0170053 A1 | 6/2015 | Miao | |
| 2017/0004567 A1 | 1/2017 | Dutt et al. | |
| 2017/0213155 A1 | 7/2017 | Hammond et al. | |

OTHER PUBLICATIONS

Boudet et al., The future of personalization—and how to get ready for It. Mckinsey & Company. pp. 1-7 (2019), Retrieved on Apr. 6, 2023: https://www.mckinsey.com/business-functions/marketing-and-sales/our-insights/the-future-of-personalization-and-how-to-get-ready-for-it.

PCT/US2021/057822 International Search Report and Written Opinion dated Jan. 31, 2022.

* cited by examiner

METHODS AND SYSTEMS FOR MODULAR PERSONALIZATION CENTER

CROSS-REFERENCE

This application claims priority to U.S. Provisional Patent Application No. 63/110,518, filed Nov. 6, 2020, which is entirely incorporated herein by reference.

BACKGROUND

In the digital age of instant gratification, consumer attention span is gradually getting shorter. The need to provide the perfect experience to each website visitor is stronger. Personalized recommendations and experiences may meet such need. For instance, services, products, information, consumer experiences, or messages can be personalized or tailored to individuals based on information that a company or merchant has gathered about the individual or groups of individuals. For example, different products can be recommended to different consumers when they are shopping on the same website. Personalization has been recognized as one of the most efficient and cost-effective strategies for increasing consumer engagement. However, developing a website to provide personalized services can be expensive or requires specific expertise, or tedious integration process. Additionally, users may be required to customize or set up the styling or rules associated with the personalization items individually which can be time consuming.

SUMMARY

Current personalization systems may be expensive, require specific expertise or tedious and time-consuming integration process. For instance, current personalization features (smart elements) such as product recommendations (e.g., product catalog, dynamic personalized content) are provided as add-on features to an existing web-page (e.g., icon, menu, etc.) may require a user to individually set up each smart element such as specifying the location on the target site where the smart element to appear and the rules associated with the smart element. This may result in a costly process to build and create a website with the above-mentioned personalization features. Therefore, a need exists for a system or method that can provide an improved personalization experience and automate personalization rapidly at ease.

The present disclosure provides a platform addressing the above needs by automating the personalization process and providing enhanced personalization features thereby improving the performance. In particular, a or personalization module or the enhanced personalization features are provided as a personalization package that does not require set up for each individual personalization features or requesting user input for deployment strategies (e.g., placement of the personalization features) or rulesets. For instance, the personalization features herein (e.g., personalized recommendations) may be provided autonomously from the target site that the personalization features may not be altered according to the content of the target site. The personalization features may be deployed in a manner that is independent of the display of content on the target site such that the packed personalization features may be personalized or improved and free from the existing user experience of the target site, user traffic, branding of the target site and various other factors. For example, the front-end personalization elements may be presented using a modular/widget approach to provide instant full website personalization.

In some embodiments, the personalization elements may be presented within a popup window/widget (e.g., personalization center) that is displayed over the target site allowing for instantaneous full website personalization. In some cases, the personalization center may be launched upon a user clicking on a bubble, tab, or banner that exists on the target site and upon the click, the popup window may be instantly displayed over the target site including various recommendation lists that are personalized to the individual on the target site.

In an aspect, a system for providing personalization for a target website is provided. The system comprises: an artificial intelligence (AI) engine including one or more machine learning algorithm trained models for providing one or more personalization features; and a personalization module configured for integrating the one or more personalization features into the target website, wherein the one or more personalization features are rendered within a popup widget that is displayed over a portion of the target website.

In a related yet separate aspect, a computer-implemented method for providing personalization for a target website is provided. The method comprises: providing an artificial intelligence (AI) engine including one or more machine learning algorithm trained models for providing one or more personalization features; integrating the one or more personalization features into the target website; and rendering the one or more personalization features within a popup widget that is displayed over a portion of the target website.

In some embodiments, the popup widget is triggered upon a user input received on an element displayed on the target website. In some cases, the target website and the one or more personalization features are displayed on a mobile device and the element is displayed at a location reachable by a thumb of an individual while using the mobile device. In some embodiments, the popup widget covers no more than 90% of a webpage of the target website. In some embodiments, at least one of the one or more personalization features is configured for generating recommendations personalized to an individual visitor to the target website. In some embodiments, the one or more personalization features comprise one or more lists of items personalized to an individual visitor to the target website.

In some embodiments, a style of the popup widget automatically matches a style of the target website without user intervention. In some embodiments, the one or more personalization features are downloaded as a package and integrated to the target website in a plug-and-play fashion without requiring setting up the target website or the one or more personalization features.

In some embodiments, the system further comprises a client portal for modifying a style of the popup widget. In some cases, the client portal allows a user to modify a user action for triggering or exiting the popup widget.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
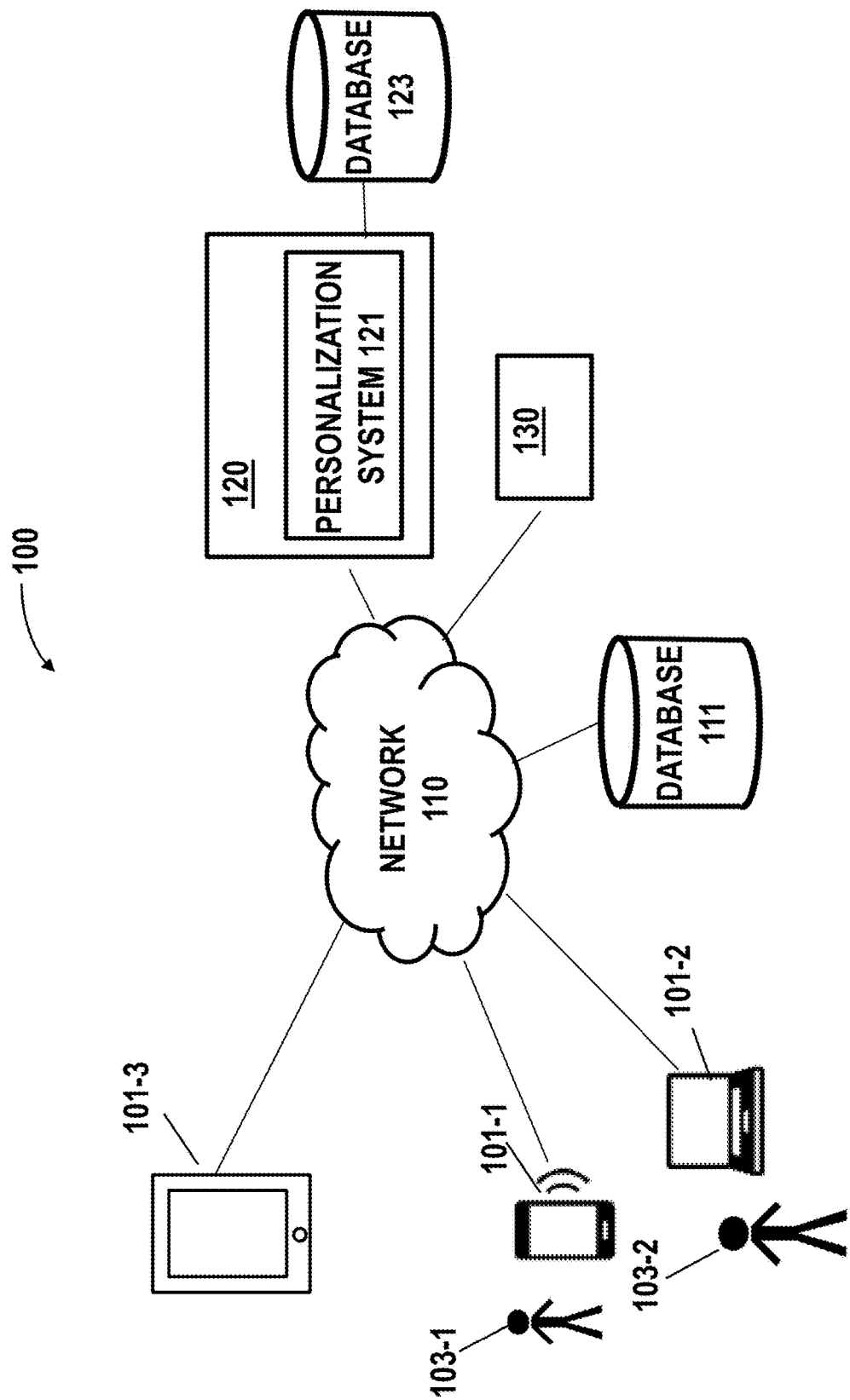
FIG. 1 schematically shows a network or personalization platform in which the method and system for automated personalization can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Current on-site personalization may be desired to enable tracking on-site user behavior, building recommendation groups or predicting a customer's next steps, integrating product or recommended content catalogs, showing the recommendations to consumers via a website, email or other media channels. However, the current personalization features (smart elements) such as product recommendations (e.g., product catalog, dynamic personalized content) are provided as add-on features to an existing web-page (e.g., icon, menu, etc.). A user may be required to individually set up each smart element such as specifying the location on the target site where the smart element to appear and the rules associated with customizing or displaying the smart element. This may result in a costly process to build and create a website with the above-mentioned personalization features.

The present disclosure provides a platform addressing the above needs by automating the personalization process and providing enhanced personalization features thereby improving the performance. In particular, the enhanced personalization features are provided as a personalization package that does not require set up for each individual personalization features or requesting user input for deployment strategies (e.g., placement of the personalization features) or rulesets. For instance, the personalization features herein (e.g., personalized recommendations) may be provided autonomously from the target site that the personalization features may not be altered according to the content of the target site.

The personalization features may be deployed in a fashion that is independent of the display of content on the target site such that the packed personalization features may be personalized or improved and free from the existing user experience of the target site, user traffic, branding of the target site and various other factors. For instance, the personalization features may function independent of pre-limitations on the underneath target site. For example, the personalization features may work with any amount of website traffic without being limited by threshold to user traffic of the target website.

In some embodiments, the front-end personalization elements may be presented using a modular/widget approach to provide instant full website personalization. The personalization elements may be presented within a popup window/widget (e.g., personalization center) that is displayed over the target site. In some cases, the personalization center may be launched upon a user clicking on a bubble, tab, or banner that exists on the target site and upon the click, the popup window may be instantly displayed over the target site including various recommendation lists that are personalized to the individual who visits the target site.

Unlike traditional personalization features which are provided as a technology, the personalization features described herein are provided as a package or packaged product which can be integrated into a target site in a plug-and-play fashion. For instance, the personalization features may be downloaded directly from a store (e.g., plugin/app store) provided by the platform.

The platform may allow users (e.g., merchants, developers, sales manager) to rapidly build website elements to generate recommendations for their consumers. The deployment process may require minimal user input. For instance, the personalization center or widget can be autonomously provided to the target site without the user setting up the rulesets or placement for the entire or a part of the personalization features. In some cases, the personalization center may be deployed with default settings that the personalization center is displayed in the form of a widget that is independent of the underneath target site. For instance, the personalization center may have styles or use templates that appear differently from those of the target site which is displayed over. Alternatively or additionally, the personalization center may be displayed with a styling or template that automatically match the styling of the target site. This beneficially provides a by-pass deployment of the personalization features without going through the design and set up of the smart elements to conform with the target site. Alternatively or in addition to, users may choose to customize the personalization center via the platform. The website personalization can be performed in an automated manner with journey-aware recommendations in real-time.

The personalization platform may include a fully automated recommendation engine that can provide automated predictions, personalization lists and recommendations without requiring configuration and can be rapidly integrated at ease. The personalization platform may include an advanced ruleset engine to further customize personalization results and consumer interaction as needed.

Additionally, current personalization products may largely focus on building consumer segments (e.g., demographic, geographic, etc.) and using static rulesets to select a set of products to recommend to a consumer segment. Such recommendation may be tailored to a segment or a group of consumers sharing similar traits rather than truly individualized personalization. An artificial intelligence (AI) engine of the personalization platform may be capable of generating personalized recommendations that are unique to each consumer by leveraging the knowledge extracted from each unique individual on a website. Additionally, the AI engine of the personalization platform may be capable of accurately predicting what the consumers will engage with in the future. The provided systems and methods may allow for a range of use cases in industries such as online shopping, e-commerce, content creation (report, brochures, digital magazines, product guides, sales playbooks, sales proposals, whitepapers, newsletters, company handbooks, annual reports, etc.), advertisement, restaurants and dining, tourism and entertainment, healthcare, service delivery, and various others that at least part of the services are delivered through a website, media channel or digital product.

A user of the provided system may be an individual (e.g., marketing managers, eCommerce team, content managers, sales people, recruiters, marketers, website designer, etc.), an entity (e.g., merchant, retailer, business, company, organization, etc.), a group of individuals that may be retailer, website designer or content creators who are customizing and personalizing the website, a customer experience or digital content. A user of the personalization platform may also include individuals who manage the various workflow (e.g., content creation, content personalization) and various other functions of the platform. The personalizing features for the media content or website may be generated with minimal user input. For example, a user (e.g., retailer, merchant, marketing managers, content managers, sales people, recruiters, marketers, etc) may not be required to possess webpage design, machine learning, analytics or content creation expertise in order to generate a desired website or content with the personalization features. The provided The personalization platform may provide various front-end features to increase customer engagement and allow for an easy customization of such features. The front-end features may be provided as a package or packaged product that minimize requirement for user input. In some embodiments, the front-end features may be presented using a modular/widget approach to provide instantaneous full website personalization. For instance, the front-end personalization elements may be a personalization center presented using a modular/widget approach to provide instantaneous full website personalization over the target site. For example, the personalization elements (e.g., personalization center) may be presented within a popup window/widget that is displayed over the target site. The popup widget may include the features personalized to the individual and allow the individual to navigate within the popup widget on top of the target site. This allows customers or visitors to the target site to have improved user experience without navigating away from the underneath target site. Details about the unique front-end personalization features are described later herein.

The personalization platform may provide dynamic content (e.g., variant catalog, images, blogs, text, etc.) and various features to create dynamic user experience thereby increasing the click through rate, bounce rate and product purchases. For example, the personalization platform may provide feature with the ability to add content variants, provide features to automatically render the optimal content for each user as well as the capability to display any web element with dynamic content (e.g., images, blogs, text, etc.). The web elements and dynamic content may be displayed within the popup widget as described above.

The personalization platform may provide personalization lists, product recommendations such as product catalog that are personalized per each individual customer thereby increasing the conversion rate, revenue, bounce rate and converting existing customers into repeated customers. For example, the personalization platform may provide intelligent product catalog enrichment feature, full product catalog ranking feature, individualized product recommendations per user, enabling displaying of any web element with product recommendations and various other features. In some cases, such personalized recommendations may be displayed in the form of or within the popup widget as described above.

The personalization platform may provide dynamic social media content that is relevant to a given user thereby increasing brand loyalty and retention, click through rate, monthly active users and the like. For example, the personalization platform may provide features for integration with social platforms, displaying social content individualized per user, displaying any web element with dynamic social content (e.g., social image catalog).

The personalization platform can provide various other features for personalizing content such as electronic mail (Email). For instance, the personalization platform may provide features allowing for fast and simple connection to Email service provider (ESP) platforms, generating emails/newsletters personalized on a per-user basis, the ability to customize any email template element to be personalized. The personalization platform can generate personalized content and recommendations in an email delivered to the target individual user thereby increasing the monthly active users, and conversion rate. The content and recommendations can be personalized at a per-user level.

The personalization platform may be capable of automating the process of integrating personalizing features to the content and website with improved efficiency and personalization capability. In particular, the personalization platform may provide automation and modular features allowing for creation of the personalization features or AI-enabled products (e.g., product recommendations, catalog recommendations, etc.) and content for personalization (e.g., report, brochures, digital magazines, product guides, sales playbooks, sales proposals, whitepapers, newsletters, company handbooks, annual reports, etc.) with reduced time and improved personalization at granular level. For example, the personalization platform may allow for easy integration, configuration, control and management of personalizing features (e.g., personalized catalog recommendation or product recommendation) by providing analytics features, smart elements (e.g., dynamic HTML, elements), advanced ruleset engine, features to understand the personalization rulesets and their impact, features to track and manage the historical change of the smart elements, rulesets and active models, and features for administrative management of the platform.

In some cases, the provided systems may employ artificial intelligence techniques to generate intelligent product catalog enrichment feature, enable full product catalog ranking, predict individualized product recommendations per user, analyze the customer interaction data to extract the intelligence and insight, generate personalized recommendations, or generated content-based recommendations.

Artificial intelligence, including machine learning algorithms, may be used to train a predictive model for predicting a recommendation (e.g., catalog, content, message, user intent, user interest, etc.), extracting the usage analytics, performance analytics, impact analytics as described above, and various other functionalities as described elsewhere herein. A machine learning algorithm may be a neural network, for example. Examples of neural networks that may be used with embodiments herein may include a deep neural network, convolutional neural network (CNN), and recurrent neural network (RNN). In some cases, a machine learning algorithm trained model may be pre-trained and implemented on the provided personalization system, and the pre-trained model may undergo continual re-training that may involve continual tuning of the predictive model or a component of the predictive model (e.g., classifier) to adapt to changes in the implementation environment over time (e.g., changes in the customer/user data, insight and analytics data, model performance, third-party data, etc.).

The term "labeled data" or "labeled dataset," as used herein, generally refers to a paired dataset used for training a model using supervised learning. The labeled data may be generated by expert or using auto-labeling techniques. Alternatively, methods provided herein may utilize an un-paired training approach allowing a machine learning method to train and apply on existing datasets that may be available with an existing system. In some cases, the training method may include semi-supervised learning or unsupervised learning. For example, the training method may involve pre-training one or more components of the predictive model, an adaptation stage that involves training the predictive model to adapt to a customer to which the pre-trained model is applied, and an optimization stage that involves further continual tuning of the predictive model or a component of the predictive model (e.g., classifier) to adapt to changes in the implementation environment over time (e.g., changes in the target site, model performance, customer-specific data, etc.).

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 schematically shows a network or personalization platform 100 in which the method and system for automated personalization can be implemented. A platform 100 may include one or more user devices 101-1, 101-2, 101-3, a server 120, a personalization system 121, one or more third-party systems 130, and a database 111, 123. Each of the components 101-1, 101-2, 101-3, 111, 123, 120, 130 may be operatively connected to one another via a network 110 or any type of communication link that allows transmission of data from one component to another.

The personalization system 121 may be configured to permit users (e.g., merchant, sales manager, content creators, personalizers, analyzers, administers, etc.) to incorporate or intergrate personalization features to an existing website, modify and manage smart elements, generate or modify a set of rules associated with a personalization product and manage various aspects of the platform. The personalization system 121 may include a plurality of functional components such as an AI engine, personalization engine, user interface module and the like. Details about the various functional components are described later herein.

In some cases, the personalization system 121 may be configured to train one or more predictive models (e.g., RNN, CNN) for making predictions on the personalized recommendations, content, services or experiences. The personalization system 121 may be configured to perform one or more operations and provide one or more features consistent with those disclosed with respect to FIGS. 2-9.

In some embodiments, the personalization system 121 may provide frontend features (e.g., tracker plugin) that are configured to track, analyze and extract insight about how a customer interact with a website and/or personalized content. In some cases, the AI-based recommendations (e.g. product catalog) may be rendered on a target e-commerce site with tracking features (e.g., web analytics tracker), that is capable of extracting intelligence and insight for a variety of applications. For instance, data may be collected indicative of customer interaction with the target site and user behavior. In some cases, the data may be analyzed to extract metrics and usage analytics measuring the degree to which media content were provided or made available to and viewed by customers (e.g., the number of times a content item was pitched to customers), to extract performance metrics measuring the degree to which visitors have engaged with (e.g., clicked, read, edited, shared, saved) the content (e.g., the dwell time on an item, such as the amount of time that the content was displayed in a content viewer (e.g., web browser or other application), to extract impact analytics indicative of the personalized elements' impact on business metrics (e.g., average revenue per pitch of a content item that may be obtained from other systems, such as customer relationship management (CRM) systems, marketing automation systems, etc.), and various other analytics. Such analytics may be used to further retrain or update a predictive model.

The personalization system 121 may be implemented anywhere within the platform, and/or outside of the platform 100. In some embodiments, the personalization system 121 may be implemented on the server 120. In other embodiments, a portion of the personalization system 121 may be implemented on the user device. Additionally, a portion of the personalization system 121 may be implemented on the third-party system. Alternatively or in addition to, a portion of the personalization system 121 may be implemented in one or more databases 111, 123. The content personalization system 121 may be implemented using software, hardware, or a combination of software and hardware in one or more of the above-mentioned components within the platform. Details about the personalization system 121 are described in FIG. 2.

In some embodiments, a user (e.g., development team, merchant, retailor, etc.) 103-1, 103-2 may be associated with one or more user devices 101-1, 101-2, 101-3. User device 101-1, 101-2, 101-3 may be a computing device configured to perform one or more operations consistent with the disclosed embodiments. Examples of user devices may include, but are not limited to, laptop or notebook computers, desktop computers, mobile devices, smartphones/cellphones, wearable device (e.g., smartwatches), tablets, personal digital assistants (PDAs), media content players, television sets, video gaming station/system, virtual reality systems, augmented reality systems, microphones, or any electronic device capable of analyzing, receiving (e.g., receiving user input in one or more fields for modifying rulesets, creating and editing smart elements, etc.), providing or displaying certain types of data (e.g., rendering of smart elements on a target site, etc.) to a user. The user device may be portable. In some cases, the user device may be located remotely from a human user, and the user can control the user device using wireless and/or wired communications. The user device can be any electronic device with a display.

User device 101-1, 101-2, 101-3 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications provided by the personalization system 121 that allow the user device to communicate with and transfer data between server 120, the personalization system 121, and/or database 111.

The user device 101-1, 101-2, 101-3 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User device 101-1, 101-2, 101-3 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may display, for example, a client portal with various features such as analytics, smart element editors, preview of the smart elements, and the like. The user device may also be configured to display webpages and/or websites on the Internet. One or more of the webpages/websites may be hosted by server 120, the third-party system 130 and/or rendered by the personalization system 121.

In some cases, users may utilize the user devices to interact with the personalization system 121 by way of one or more software applications (i.e., client software) running on and/or accessed by the user devices, wherein the user devices and the personalization system 121 may form a client-server relationship. For example, the user devices may run dedicated mobile applications or software applications for accessing the client portal provided by the personalization system 121. The software applications for managing the platform, creating personalization features, and for rendering and delivering the content may be different applications. Alternatively or additionally, the client application may comprise different modes for a user to modify a smart element, to view analytics associated with a target site, to manage the AI engine, respectively.

In some cases, the client software (i.e., software applications installed on the user devices 101-1, 101-2, 101-3) may be available either as downloadable software or mobile applications for various types of computer devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

In some cases, the provided platform may generate one or more graphical user interfaces (GUIs) for the content personalizer interface. The GUIs may be rendered on a display screen on a user device (e.g., a personalizer's device). A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices, smart phones, personal digital assistants (PDAs), and tablets).

User devices may be associated with one or more users. In some embodiments, a user may be associated with a unique user device. Alternatively, a user may be associated with a plurality of user devices. A user may be registered with the platform. In some cases, for a registered user, user profile data may be stored in a database (e.g., database 123) along with a user ID uniquely associated with the user. The user profile (e.g., personalizer profile) data may include, for example, user names, user ID, identity, business field, contact information, historical data, and various others as described elsewhere herein.

A server 120 may access and execute the personalization system 121 to perform one or more processes consistent with the disclosed embodiments. In certain configurations, the personalization system may be software stored in memory accessible by a server (e.g., in memory local to the server or remote memory accessible over a communication link, such as the network). Thus, in certain aspects, the personalization system(s) may be implemented as one or more computers, as software stored on a memory device accessible by the server, or a combination thereof. In some embodiments, one or more systems or components of the present disclosure are implemented as a containerized application (e.g., application container or service containers). The application container provides tooling for applications and batch processing such as web servers with Python or Ruby, JVMs, or Hadoop or HPC tooling. The various functions performed by the client terminal and/or the personalization system such as creating smart elements, generating ruleset for further modifying AI predictions, training a predictive model, executing a trained model, updating and retraining a model and the like may be implemented in software, hardware, firmware, embedded hardware, standalone hardware, application specific-hardware, or any combination of these. The personalization system, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

The third-party system 130 can be any entities that provide content, services, e-commerce that is to be personalized via the platform 100. The third-party entity may provide services in a wide range such as online merchant, customer CRM, external content assets (e.g., social media, online resource), public or private resources and various others. In some cases, the third-party system 130 may be in communication with the personalization system via APIs such that the third-party content library, service information, inventory, product catalog, brand style availability information and the like can be communicated.

In some cases, the server 120 may also be configured to store, search, retrieve, and/or analyze data and information stored in one or more of the databases. The data and information may include tracked customer interaction data collected by the tracker plugin as well as predicted data, personalized content, user data, ruleset associated with a personalization products, data about a predictive model (e.g., parameters, model architecture, training dataset, performance metrics, threshold, etc.), data generated by a predictive model such as personalization options or extracted insight, recommendations, and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, 101-3 third-party system 130, server 120, personalization system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

User device 101-1, 101-2, 101-3, third-party system 130, server 120, or personalization system 121, may be connected or interconnected to one or more database 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the content or personalized data, ruleset data, customer/visitor analytics data, historical data, predictive model, training datasets, or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the personalization system 121 may provide customized algorithms to extract, transform, and load (ETL) the data. In some embodiments, the personalization system 121 may construct the databases using proprietary database architecture or data structures to provide an efficient database model that is adapted to large scale databases, is easily scalable, is efficient in query and data retrieval, or has reduced memory requirements in comparison to using other data structures. The document or content items may be stored in a pre-defined structured data format that are described later herein.

In some embodiments, the one or more database systems 123, 111, which may be configured for storing or retrieving relevant data. Relevant data may comprise tracked customer interaction data collected by the tracker plugin, personalized content, user data, ruleset associated with a personalization products, data about a predictive model (e.g., parameters, model architecture, training dataset, performance metrics, threshold, etc.), data generated by a predictive model such as personalization options or extracted insight, recommendations, and various other data as described elsewhere herein. In some cases, the personalization system 121 may source data or otherwise communicate (e.g., via the one or more networks 110) with one or more external systems or data sources 111, such as one or more product catalogs, media sources, analytics services, customer management services or databases. In some instances, the personalization system 121 may retrieve data from the database systems 111, 123 which are in communication with the one or more external systems (e.g., external media assets, etc.) or third-party systems 130 (e.g., third-party business entities, enterprise management software, customer management platforms, etc.).

In some cases, the database may store data related to machine learning-based models. For example, the database may store data about a trained personalized predictive model (e.g., parameters, hyper-parameters, model architecture, performance metrics, threshold, rules, etc.), data generated by a personalized predictive model (e.g., intermediary results, output of a model, latent features, input and output of a component of the model system, etc.), training datasets (e.g., labeled data, insight provided by expert, etc.), predictive models, algorithms, and the like. The database can store algorithms or ruleset utilized by one or more methods disclosed herein. For instance, user-defined ruleset to be used in combination with machine learning trained models for customizing a model prediction or AI-based product may be stored in the database. In certain embodiments, one or more of the databases may be co-located with the server, may be co-located with one another on the network, or may be located separately from other devices. One of ordinary skill will recognize that the disclosed embodiments are not limited to the configuration and/or arrangement of the database(s).

In some cases, data stored in the databases or external databases can be utilized or accessed by a variety of applications through application programming interfaces (APIs). Access to the database may be authorized at per API level, per data level (e.g., type of data), per application level or according to other authorization policies.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Various aspects of the present disclosure may be applied to any of the particular applications set forth below or for any other types of applications or systems. Systems or methods of the present disclosure may be employed in a standalone manner, or as part of a package.

Figure 2:
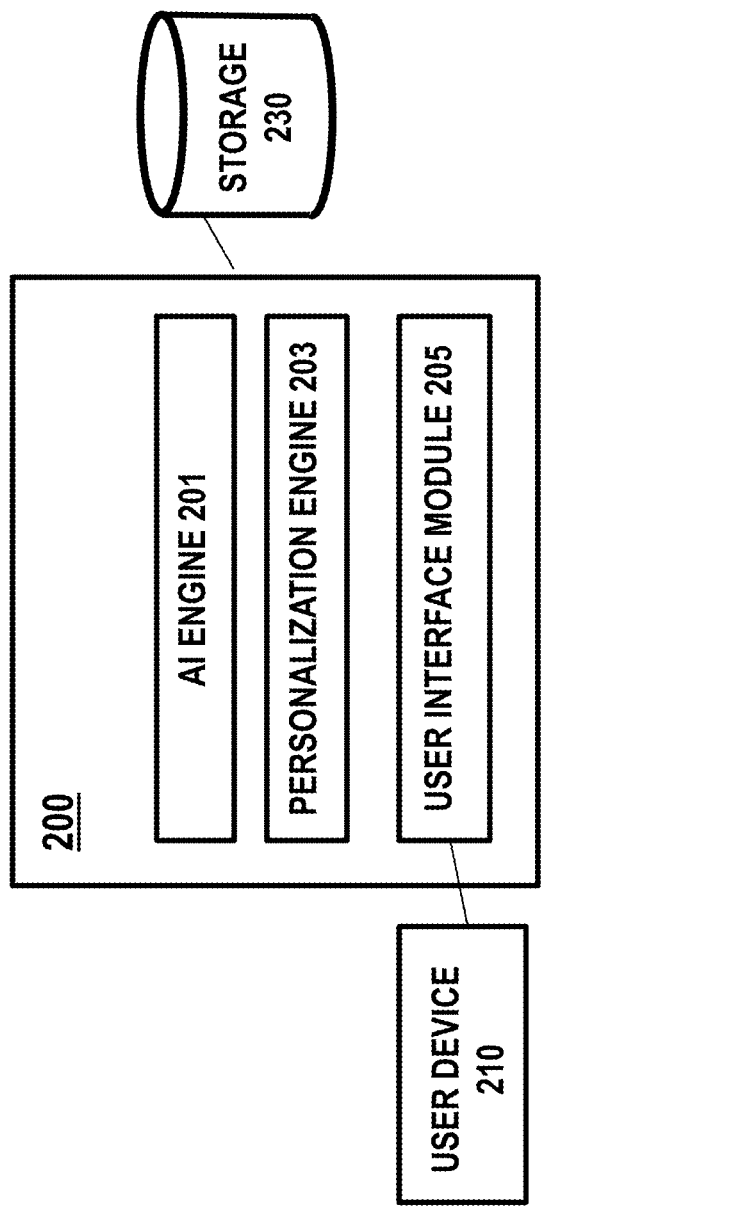
FIG. 2 schematically shows a diagram of a personalization system, in accordance with various embodiment of the present disclosure.

FIG. 2 schematically shows a diagram of a personalization system 200, in accordance with various embodiment of the present disclosure. In some cases, the personalization system 200 may provide advanced and dynamic personalization to a target website (e.g., e-commerce sites) that may increase user engagement and conversion rate. In some embodiments, the system 200 may comprise an AI engine 201, a personalization engine 203, and a user interface module 205. The system may optionally comprise a user interface 210 for creating, modifying, managing and deploying various features provided by the system. Alternatively, the user interface may be a separate component that is operably coupled to the system 200. The personalization system 200 may be the same as the personalization system as described in FIG. 1.

In some embodiments, the AI engine 201 may be configured to train, develop, manage a set of models for providing the personalization features (e.g., personalized recommendation). The AI engine may generate a plurality of AI-based outputs/products such as product recommendations, dynamic content, dynamic social content and various other personalizing features as described elsewhere herein.

In some cases, one or more machine learning-based models may be trained and developed to generate individualized product recommendations for each user. The product recommendation may include, for example, full product catalog ranking feature that takes the site's entire product catalog into account on each recommendation. The predicted results may not be limited to analyzing bestsellers or specific groups of products. As an example, each recommendation may be a full product catalog ranked from first to last of how likely a given user is to engage with the product.

In some cases, one or more machine learning-based models may be developed to generate personalized content (e.g., hero images, blog carousels, category images, etc.) that is dynamically displayed with specific content variants for each individual customer. In some cases, one or more machine learning based models may be trained to generate predicted image recommendations directly from the social media platforms connected to the site thereby increasing brand loyalty and retention.

In some cases, the AI engine may comprise a model management system for model creation and model management. The model management system may include a model monitor system that monitors data drift or performance of a model in different phases (e.g., development, deployment, prediction, validation, etc.). The model monitor system may also perform data integrity checks for models that have been deployed in a development, test, or production environment. The model monitor system may be configured to perform data/model integrity checks and detect data drift and accuracy degradation. The process may begin with detecting data drift in training data and prediction data. During training and prediction or detection, the model monitor system may monitor difference in distributions of training data, test, validation and prediction or detection data, change in distributions of training data, test, validation and prediction or detection data over time, covariates that are causing changes in the prediction output, and various others.

In some cases, the model monitor system may perform one or more integrity tests on a model and the results may be displayed on a model management console. For example, the integrity test result may show the number of failed predictions, percentage of row entries failed the test, execution time of the test, and details of each entry. Such results can be displayed to users (e.g., developers, manager, etc.) of the platform via the model management console.

Data monitored by the model monitor system may include data involved in model training and during production. The data at model training may comprise, for example, training, test and validation data, predictions, detections, or statistics that characterize the above datasets (e.g., mean, variance and higher order moments of the data sets). Data involved in production time may comprise time, input data, predictions made, and confidence bounds of predictions made. In some embodiments, the ground truth data may also be monitored. The ground truth data may be monitored to evaluate the accuracy of a model and/or trigger retraining of the model. The model monitor system may monitor changes in data such as changes in ground truth data, or when new training data or prediction data becomes available.

The one or more trained predictive or detective models may be individually monitored or retrained if model performance is below a threshold or when new data are available (e.g., data captured by the Tracker plugin). During prediction time, predictions may be associated with the model in order to track data drift or to incorporate feedback from new ground truth data.

One or more of the AI-based recommendations and predictions are delivered through the smart elements. A smart element is a user interface element that displays the predictions. The smart element can be crated, managed, and published by a user via the client portal as described later herein.

The personalization engine 203 may be configured to allow users to create and edit various AI-based products or features and integrate such features to a target website (e.g., third-party e-commerce site). The personalization engine may include a family of plugins, extensions, modules and scripts that facilitate development and integration of AI-based products and services into third-party or customers' platforms.

In some embodiments, the personalization engine 203 may comprise a personalization preview extension allowing users to preview predictions during model training and development phase as well as in the deployment phase. The personalization review extension provides the ability to enable a client to select an individual customer or select groups of customers by filtering specific site behavior and preview what products will be recommended to them. This beneficially allows users to preview the effect/results of AI products/services on-the-fly.

The personalization engine 203 may comprise a product listing page module that creates dynamic product listing pages with search and filtering options that generates ranked product recommendations depending on the search and filtering. The personalization engine 203 may comprise a search module configured to provide ranked product or content recommendations based off of search input from the user. The personalization engine 203 may comprise a popup module configured to provide ranked products or content recommendations through dynamic popups that can be configured to be delivered based on various triggers, timing, exit intent or other triggering events.

The personalization engine 203 may also allow for an easy and flexible integration of the various personalization features into any existing third-party website or platforms. The personalization engine 203 may provide a plurality of options such as raw application programming interface (API), Plugins, Google Tag Manager and the like for integrating the AI-based products to a third-party platform.

In some cases, the API plugin may create various API endpoints for extracting information (e.g., Product Catalogue), smart element rendering and code injection, and module remote configuration. As an example, the API endpoint address url may be https://shopift.xgen.dev. Calling the API may require a specific header to authorize the call. An example of the header values is listed below:

```
X-API-KEY: the api key
X-API-SECRET: the api secret
This key-pair is defined as part of the license_key.
The API returns the results encrypted and compressed.
{
   "key": "RSA_encoded_ecryption_key",
   "payload": "<base_64_encoded_encrypted_compressed_results>"
}
```

A private key may be required to decrypt the message.

The personalization engine may provide plug-and-play integration options through plugins for various platforms such as Shopify, Commerce Cloud, Magento, WooCommerce and various other third-party platforms. In some cases, certain plugin may be provided by injecting code into a third-party website. For example, a Tracker plugin is provided which can inject Tracker code into the customer's website to generate user events and send them to the platform backend. Such events tracked by the Tracker plugin may be used for personalization such as training models, making predictions, and the like. In some cases, personalization features may not require injecting code for each individual personalization feature into the target site. The personalization features (e.g., personalization center) may be downloaded as a package and deployed to the target site in the form of popup widget without being embedded into the website individually.

Tools such as Google Tag Manager may be provided for simple and rapid integration to website that are built on custom platform or websites with further customization requirement. For instance, a Google Tag Manager configuration file may be provided that can be simply uploaded to the third-party platform Google Tag Manager account for integration. Such tools may be used to manage and deploy tags (snippets of code or tracking pixels) on the target website (or mobile app) without having to modify the code.

In some cases, the personalization engine may provide features for setting up integrating configuration for the smart elements to update product catalog from the link to static files (e.g., csv). For example, the personalization engine may include a field mapping plugin that uses a mapping definition to transform the incoming file to an internal product catalog. Each mapping may contain at least two fields: "prod_code" and "prod_name."

The user interface module 205 may provide a client portal or user portal allowing users to develop, edit, create, manage the personalization features various aspects of the system. The client portal may allow users of the platform to control AI predictions, create and publish smart elements and view the results in real-time. Alternatively, the personalization center may be deployed automatically (e.g., default settings) with minimum user settings or without a user setting using the user portal. For instance, the personalization center may be displayed with a styling or template that automatically match the target site styling.

The client portal may comprise analytics features that allow users to view granular results of the predictions and recommendations within a third-party website. The analytics feature displays key statistics of the third-party website and the relationship to the active personalization on the website. This beneficially allows users to preview the impact or results of the AI-enabled products with real-time feedback.

The client portal may comprise editor features that allow users to create, edit, and manage smart elements (e.g., user interface elements) that display predictions and recommendations on the third-party website. For instance, the smart elements can be created by simply choosing from a number of templates or by using a drag & drop builder that requires no coding. The client portal may also comprise a full HTML, CSS, and JavaScript editor allowing users to create the smart elements at a code level. For instance, the full HTML, CSS, and JavaScript editor may provide a Smart Element Markup Language (SEML) which has been specifically designed to be able to code elements for personalization and rapidly integrate the AI-based products through intuitive tags and selectable variables.

The client portal may further comprise an advanced ruleset engine for configuring or modifying a trained model/AI-based product based on specific use cases or handcrafted rules. The one or more rulesets may be specified/defined to further customize an AI-based product (e.g., personalized catalog recommendation) or limit the predictions based on the rules. For example, users may be permitted to set up rules to display a list of products that all match a specific category or attribute, ensure that multiple brands do not display together on the same page, or (for A/B testing) restrict certain user groups from receiving recommendations and various other user-defined rules.

In some embodiments, the client portal may comprise a personalization potential feature allowing users to preview the impact of the user-specified rules. For instance, a Personalization Potential score may be generated providing visibility into any AI-based product or model modifications so that the effectiveness of those modifications can be pre-viewed.

The client portal may also comprise a change log feature allowing users to track and view log history of changes in the new elements published, modifications, active models and other components/features of the system.

The client portal may further provide management features allowing users (e.g., administers, clients) to set up roles and permissions to the team members who are working on the same or across projects. Examples of the client portal are described with respect to FIGS. 5-9.

The user interface module 205 may allow users to interact with the AI engine, personalization features, and various other components of the system as described above. The user interface (UI) module may provide a graphical user interface (GUI) that can be integrated into other applications (e.g., client application). For example, user may preview the predictions, edit, save, create smart elements, rulesets, access permissions via the GUI. In some cases, the user interface module may comprise proper extensions (e.g., Chrome Extension) for users to preview smart elements directly on the e-Commerce site as well as tools to help place the smart elements in specific site locations.

In some embodiments, the GUIs may be rendered on a display screen on a user device 210. The user interfaces and functionality described herein may be provided by software executing on the user's computing device, by the personalization system located remotely that is in communication with the computing device via one or more networks, and/or some combination of software executing on the computing device and the agent responder system. The user interfaces may be provided by a cloud computing system.

However, it should be noted that the client portion as described above may not be used at all for deploying the personalization center. The personalization center may be deployed without user intervention or receiving any input from the client portion. In some cases, a user may choose to further customize/modify a personalization center or the popup widget using the client portal when it is desired.

The database 230 may store the relevant data as described above. In some cases, the database may store personalized recommendations or content. The content may be stored as structured data such as JavaScript object notation (JSON) data. In some embodiments, the smart element may be stored in a pre-defined document schema that contains the data and metadata needed to render each element. The element or content may be created and stored in the database that may be implemented using various standard data-structures, such as an array, hash, (linked) list, struct, structured text file (e.g., XML), table, JSON, NOSQL and/or the like. In some cases, the content item, element or web element, such as a video, an image, a chart, a text file of a document may be stored with one or more different representations (e.g., mobile rendering, desktop rendering, rendering in a browser, rendering in a desktop application, etc.).

Modular Personalization Center

As described above, the front-end personalization features may be provided using modular/widget that may provide instantaneous full site personalization with minimal user interaction. In some cases, a user may simply download the desired package of personalization features from a personalization center and deploy the package in a plug-and-play fashion without substantial set up. The package may be out-of-the box AI that provides personalized recommendations to their shoppers. The implementation and integration may not require user set up and the target site can be personalized instantaneously (e.g., takes less than 5 seconds, 10 seconds, 20 seconds, 30 seconds, etc.) without substantial user input. For example, a user may simply select one or more personalization lists to be deployed to the target site without a need to customize or set up the rulesets or other configurations (e.g., placement, location, hook) that are traditionally required for adding a front-end element. For example, a plurality of personalization lists may be automatically arranged within the popup widget without user intervention.

In some cases, the personalization center may provide a variety of personalization lists (e.g., bestsellers, similar items, etc.). In some cases, the personalization lists may represent different experiences of shopping for an individual user, each list may be personalized on a one-to-one basis. The personalization center may permit users (e.g., e-Commerce team) to select any type of shopping experience for their customers. In some cases, users may select multiple experiences/lists. The content of the variety of lists may be generated in real-time by the AI engine and/or the backend component as described elsewhere herein.

In some cases, the personalization center may provide a variety of default lists including, but not limited to, a list containing default recommendation based on the entire product catalog for an individual customer which may include the AI prediction for the individual customer (e.g., "For You/Recommended/You Might Like"), a list including a live stream of global interactions of the target site community that may populate the most recent products that have been purchased or added to the cart (e.g., "Trending Now"), a list of randomized products (e.g., "Surprise Me!"), a popularity list (e.g., "Best Sellers"), a list of items that an individual has viewed within a specified time period (e.g., "Recently Viewed") and a list of items that at some point were abandoned in the cart (e.g., "Revisit"). Content of the above lists may be updated or provided in real-time based on the AI outputs.

In some cases, the personalization center may provide a variety of contextual lists based on the items (e.g., product) that is being viewed. The contextual lists may include, but not limited to, a list of items similar to the product being displayed (e.g., "Similar items"), and a list of items that others who purchased or viewed this item also purchased and viewed (e.g., "Purchased with").

In some cases, the personalization center may provide a variety of referrer aware lists that are generated based on the referrer to the target site (e.g., how did the person get to the target site). For example, the referrer aware lists may include, a list of products related to an advertisement that brought the individual to the target site (e.g., "Ad response"), a list of products related to the email the individual came from (e.g., "Email response"), and a list of products related to the search engine and keywords the individual entered on that search engine to get to the target site (e.g., "Search Engine Keyword Response").

In some cases, the personalization center may permit users (e.g., merchant, eCommerce team, etc.) to customize or create a list. The custom list (e.g., "Seasonal", "For Sale", etc.) can be created utilizing the ruleset engine as described above. The personalization center may include any other personalization lists such as a list of complimentary items to the item that is being viewed (e.g., "Complete the Look/Goes Good With") or a list of products filtered by a parameter (e.g., "Select by Color"). Such lists may be generated using the AI engine or deep learning techniques (e.g., deep vision) as described above.

The personalization center may be provided for a website deployed in a mobile browser. Mobile browsers are usually optimized so as to display web content most effectively for small screens on portable devices. For example, when an individual holds a mobile device, they may try to use only one hand which makes standard website navigation difficult and awkward to use on a mobile device. The standard navigation element for a responsive web is to collapse the navigation into a hamburger or menu item which can be hard to reach (e.g., menu item located on top left or top right of the site) and inconveniently hide the navigation from the individual. On a mobile app, the navigation is often set at tabs at the bottom of the screen (e.g., Primary Navigation). This allows for navigation with one hand and makes the key points of navigation or calls to action visible.

However, user experience can be unsatisfied limited by such mobile browser display. For example, displaying additional smart elements to an existing target site may cluster the GUI elements and make it difficult for user to navigate the website. The present disclosure provides a novel widget-based personalization center that allows for instantaneous full site personalization without impairing the view or use of the target site. FIGS. 3A-C and FIG. 4 show examples of a widget approach to provide the personalization features.

Figure 3A:
FIGS. 3A-3C and FIG. 4 show examples of a widget approach to provide the personalization features.
Figure 3B:
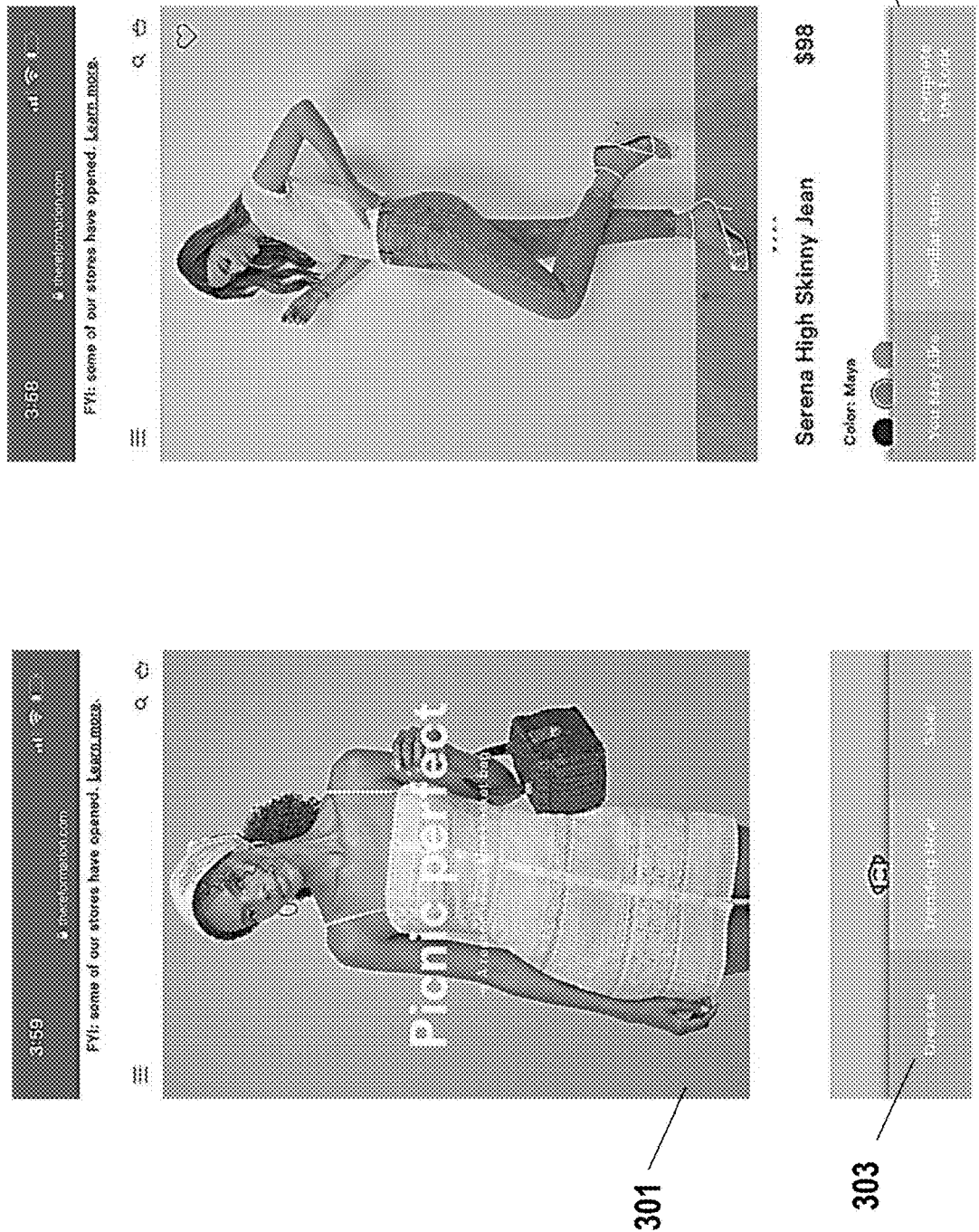
Figure 3C:
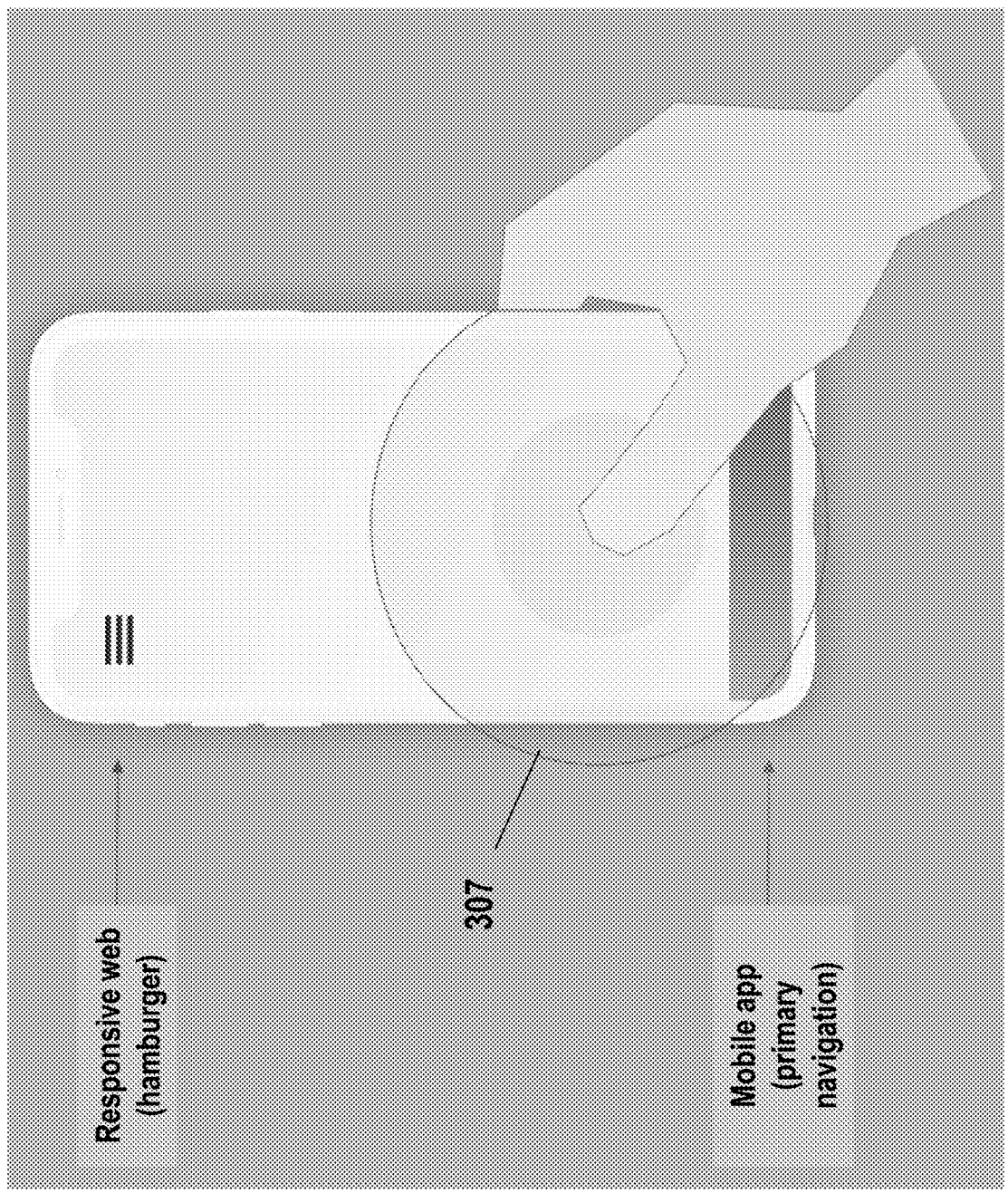

In some cases, the widget-based personalization features may be launched from a primary navigation tab, button, or banner on the target site. In some cases, such as primary navigation tab, button, or banner may be displayed at a location easily reached by thumb(a) when a user holding a mobile device. As shown in FIG. 3A, the widget-based personalization features may be activated from buttons, tabs or banners 309 displayed on a target website. FIG. 3B shows examples of tabs 303 for launching a variety of personalization lists from a target website 301 on a mobile browser. In some cases, the personalization center on a mobile-based browser may exist as Primary Navigation tabs that always exist on the bottom of the webpage. The (Primary Navigation) tabs 301 may be displayed on the bottom of a webpage or other locations that can be easily reached by an individual. As shown in FIG. 3C, in some cases, the primary navigation tabs may be preferred to be located within a region 307 that can be easily reached with thumb(a) while a user holding a mobile device. Referring back to FIG. 3B, in some cases, the tabs may each correspond to a personalization list as described above. An individual may scroll/swipe left and right to view additional tabs 305 (e.g., dresses, trending now, sales, you may like, similar items, complete the look).

In some cases, the navigation tabs may be displayed on the target webpage such that an individual can easily access the personalization features at any time. In some cases, a user (e.g., eCommerce team, web developer, merchant, etc.) may choose to customize the tabs (e.g., appearance, location, etc.) via the platform herein.

Figure 4:
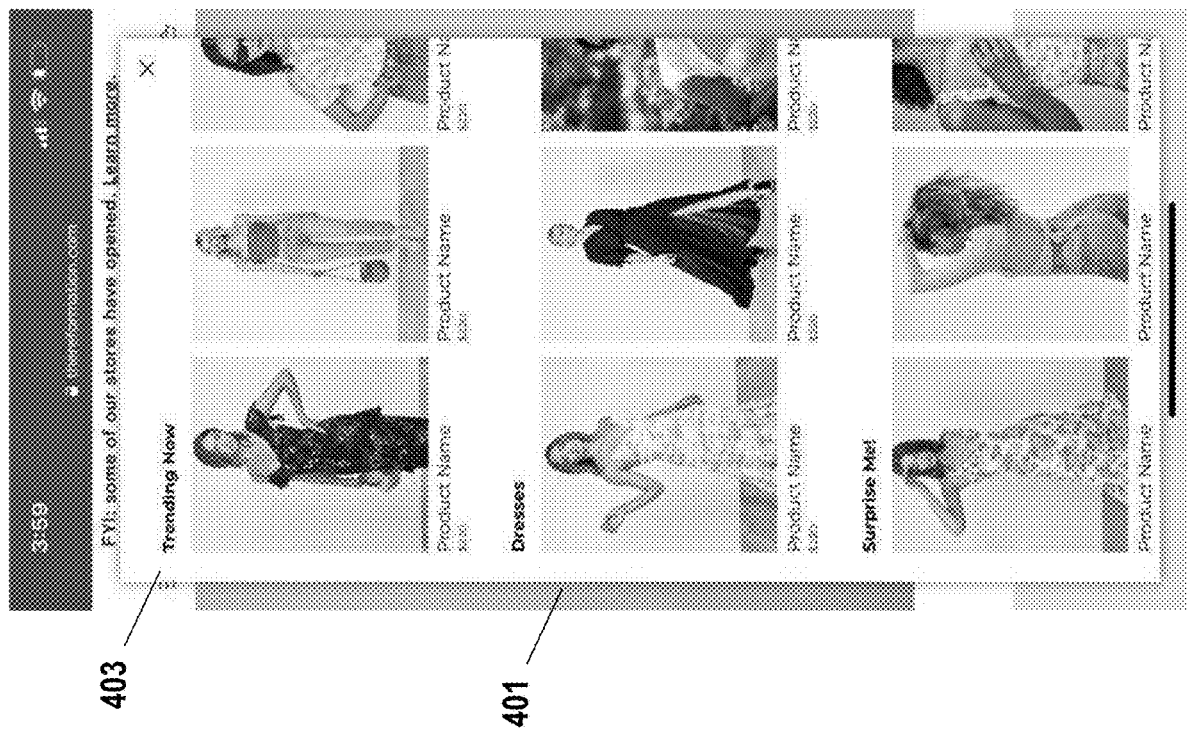
Figure 5:
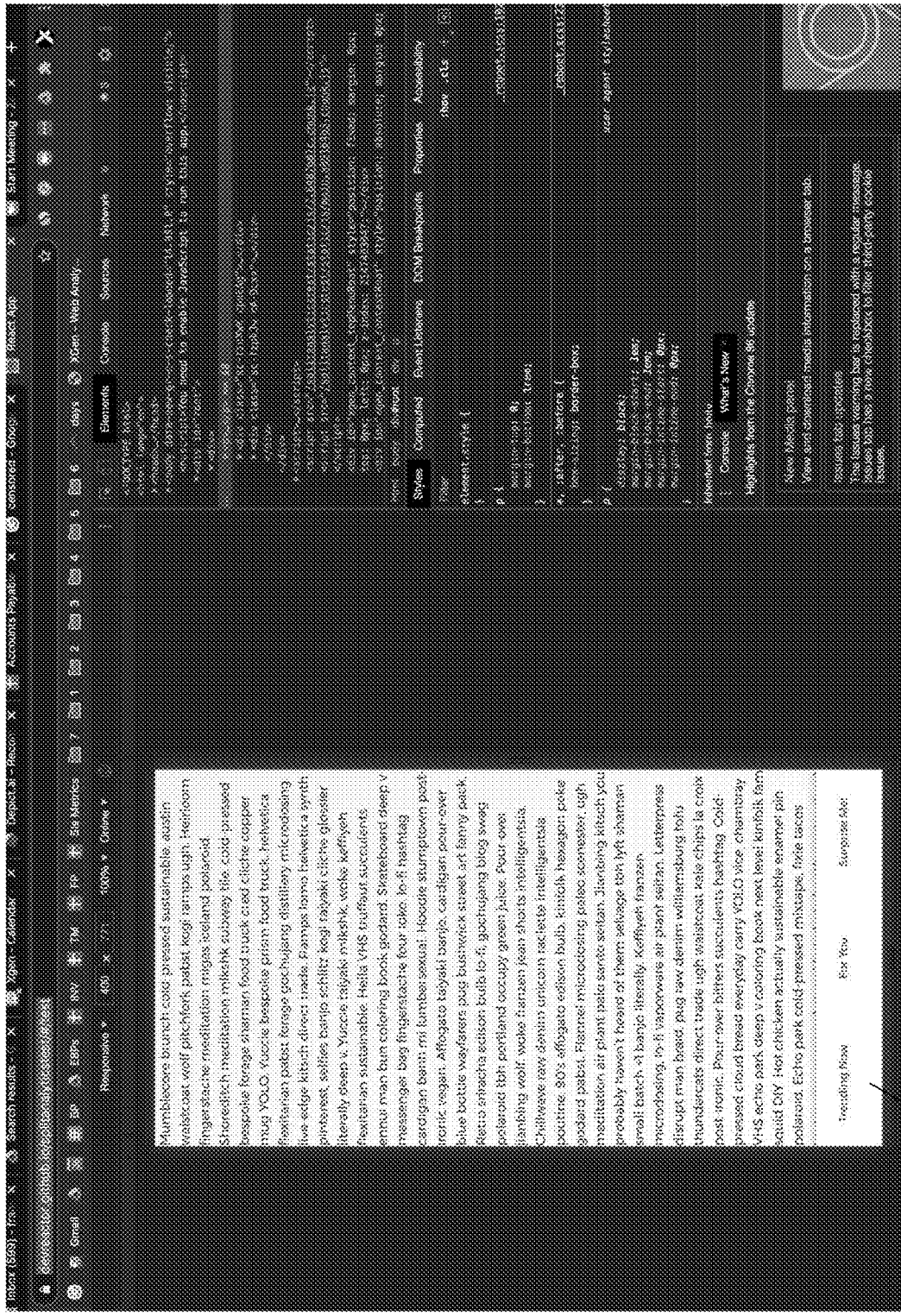
FIGS. 5-9 show examples of a user portal for integrating the personalization center to a target website.
Figure 6:
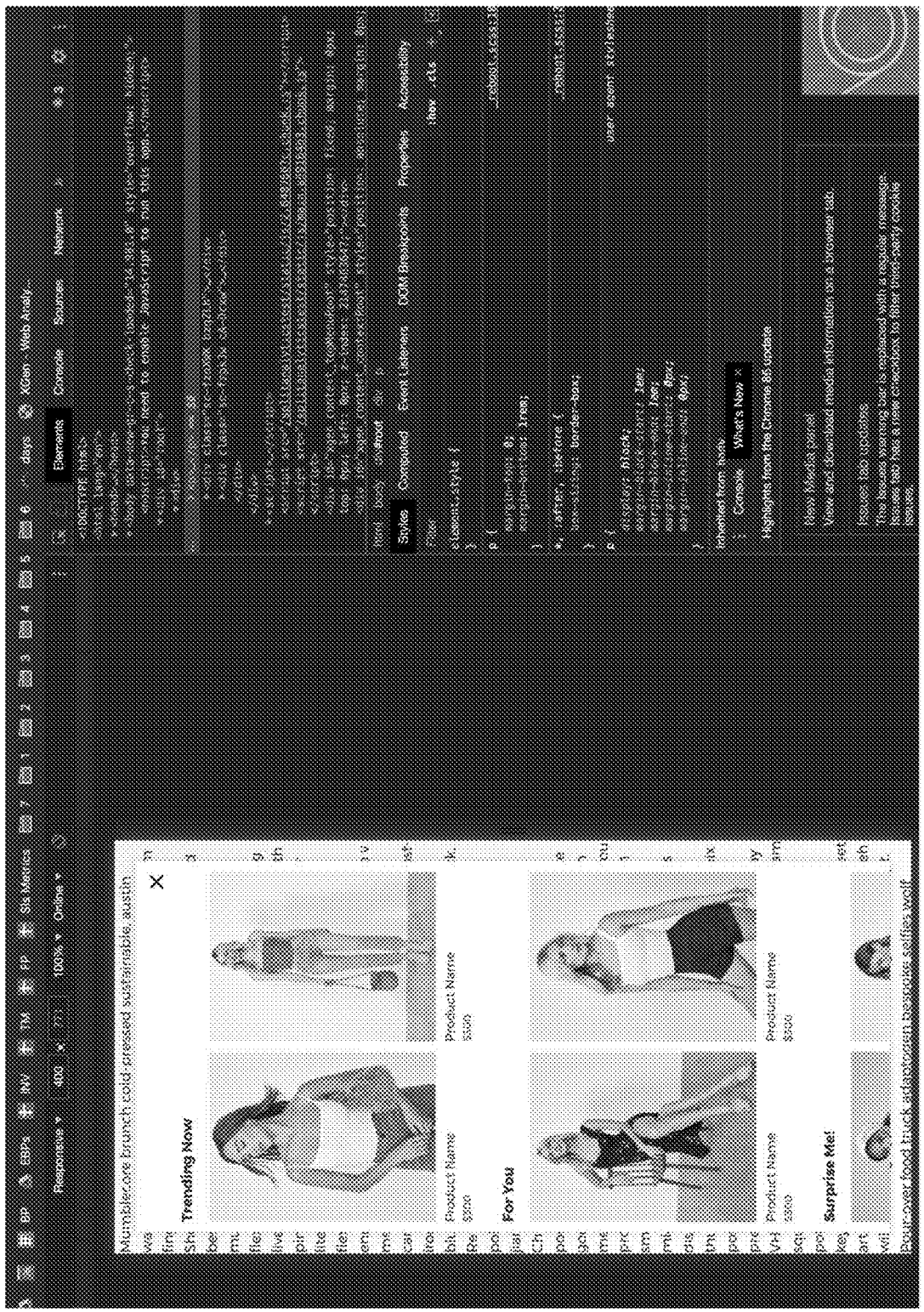
Figure 7:
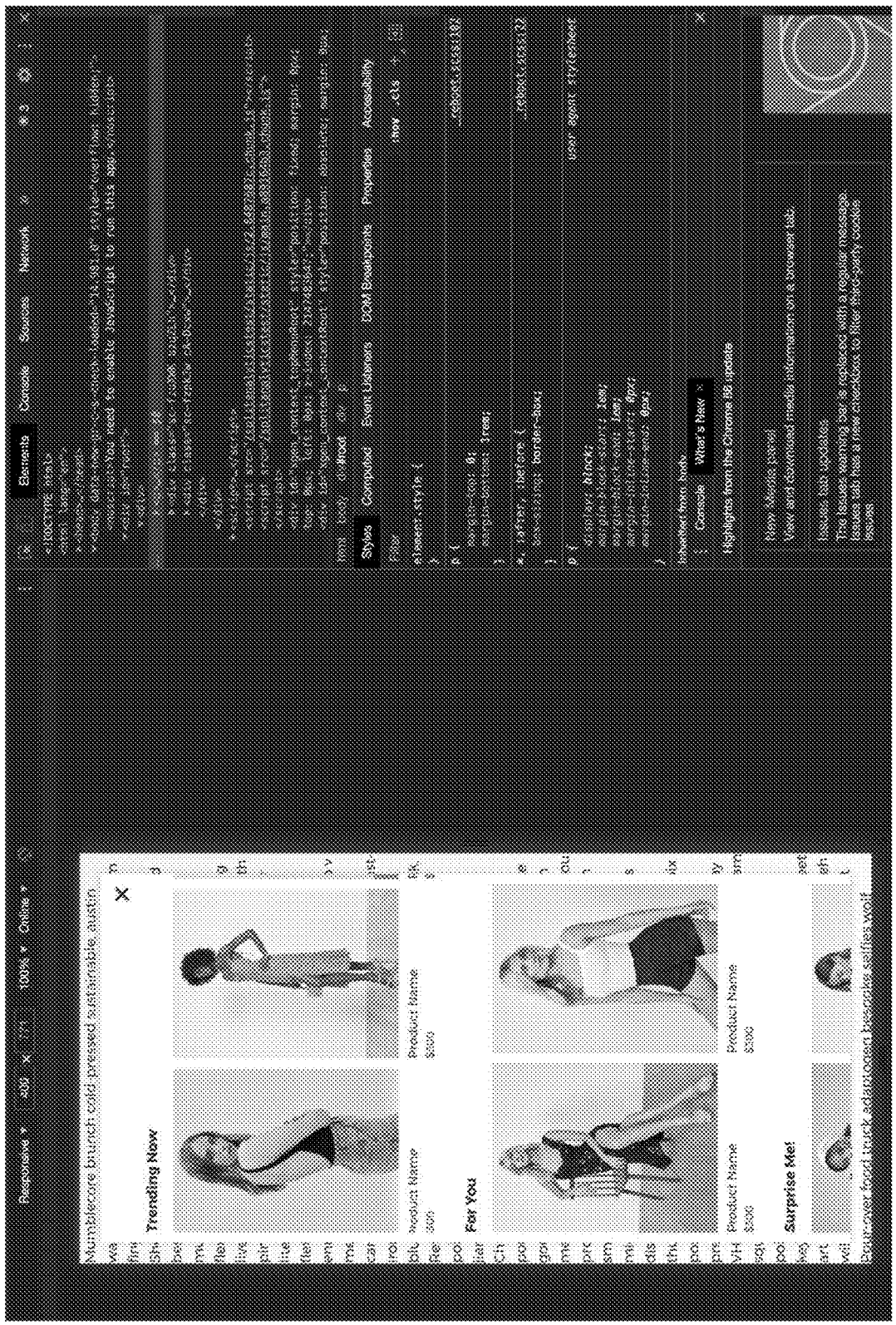
Figure 8:
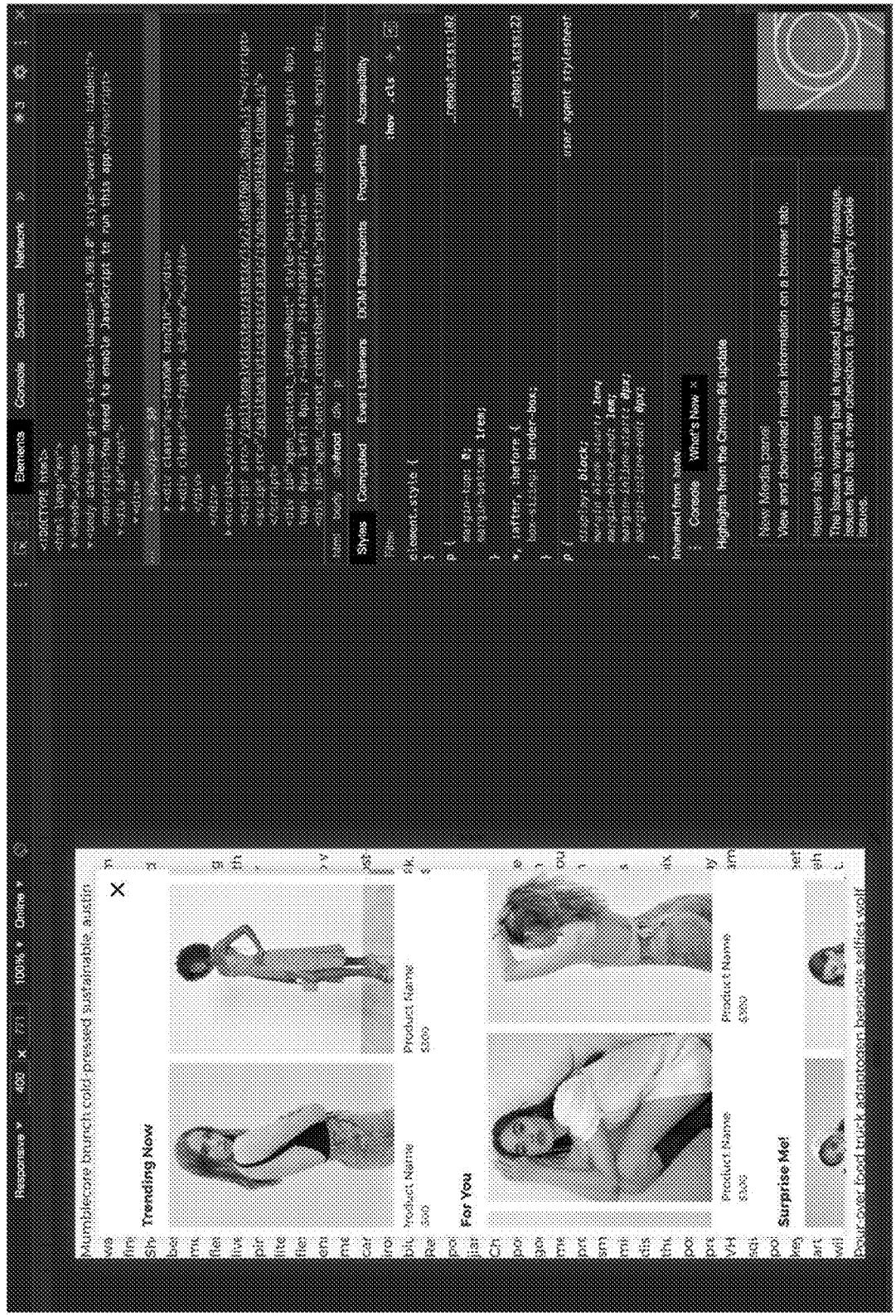
Figure 9:
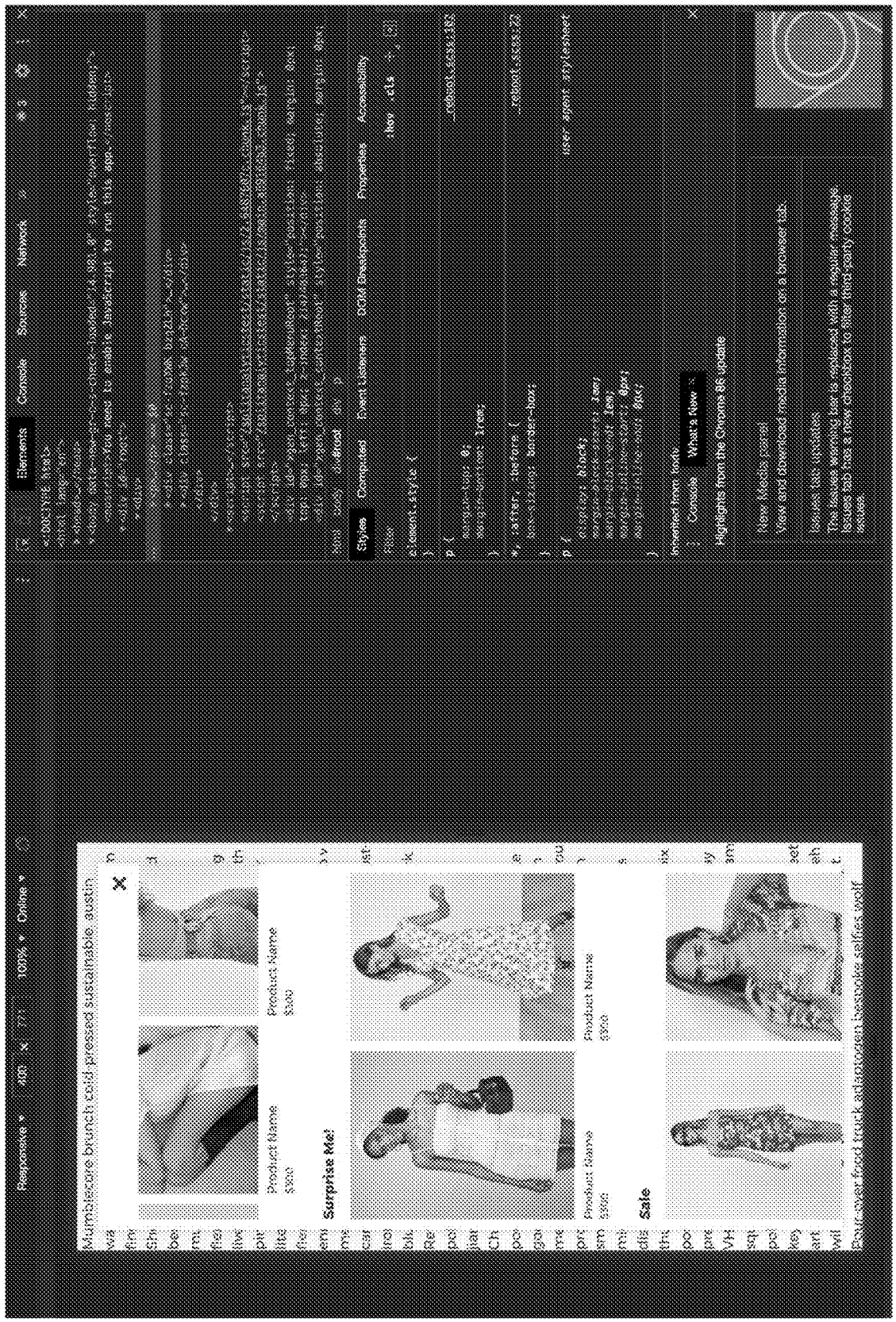

Upon an individual or customer clicks on the tabs, the items included in each of the personalization list may be displayed in the form of or within a popup widget. The popup widget may be displayed over the target webpage. FIG. 4 shows an example of the popup widget 403 displayed over a target webpage 401. The popup widget 403 may not cover the entire screen/underneath target page so that the individual knows they have not been navigated away from the target site. The popup widget may cover no more than 99%, 95%, 90%, 80%, 70%, or 60% of the underneath target webpage. The popup widget may cover a portion of the visible webpage. The popup widget may cover any portion of the target page so long as the individual is able to visualize at least a portion of the underneath target site so they are aware that they are not navigated away from the target webpage.

In some cases, the personalization center and product navigation may always accessible and exist above the page fold. The personalization center may be displayed over the target site without embedding into the website. By not embedding the personalization center into the website, an individual may conveniently navigate through the target site and access the personalized content at anytime without losing their place on the target site. It also beneficially allows the target site to provide enhanced personalization experience while preserving its own style.

The popup widget or personalization center 403 may display one or more personalized lists of items. As shown in the example, the popup widget may display a trending now list, dresses list, surprise me list and various others. A user may navigate through popup widget and interact with the items. In some cases, the popup widget may permit the users to navigate and interact with the items in a manner similar to interacting with a mobile application. For example, a customer may scroll/swipe left and right within a list to view additional/different items or scroll/swipe up and down to view additional/different personalization lists. This beneficially provides an instant full site personalization and UI improvement without modifying the target site arrangement.

The popup widget or personalization center can be triggered in any suitable manner. For instance, the personalization center may be automatically open in response to a user clicks on the tabs displayed on the target site. Additionally or alternatively, the personalization center may be triggered based on other user behavior or the target page conditions. The personalization center may be exited upon a user operation. For instance, a user may exit the personalization center by any suitable user operation (e.g., swiping up/down, clicking on exit button, clicking on any portion of the underneath target site, etc.). The user operation to trigger the personalize center or exit the personalization center may be set up via the platform.

The platform may provide the personalization center in a fully plug-and-play fashion. Integration may not require users to set up the smart elements or the popup widgets. Alternatively or additionally, users may be permitted to customize the personalization center via a user portal. FIGS. 5-9 show examples of a user portal for integrating the personalization center to a target website. The user portal is provided to make it easy to set the tabs and popup widget/personalization center directly on the site. The user portal and the tool for deploying the personalization center is provided by the platform herein. The platform may permit direct drag-and-drop of a target site and integration of the personalization center in a plug-and-play fashion. The personalization center may include any other personalization features (e.g., dynamic content, recommendations) as described elsewhere herein.

In some cases, the platform may provide options for users to customize/create any personalize list such as by setting the advanced ruleset (supported by the ruleset engine). In some cases, the personalization center may be displayed with a styling or template that automatically match the target site styling. For instance, the theme, template, color, or other appearance of the personalization center may be matched to those of the target site without user intervention. Alternatively, a user may choose to modify or select the template styling for the personalization center. The personalization center is also compatible with the SEML options as described above which allows users to alter the appearance and structure of personalization center at the code level. The platform may permit users to customize or set up one or more trigger actions to open the personalization center or change the appearance or behavior (e.g., animation) of the personalization center based on a given trigger action or page conditions. The platform may also permit users to customize or set up one or more trigger actions to exit the personalization center. For example, a user may set up one or more user operations (e.g., swiping up/down, clicking on exit button, clicking on any portion of the underneath target site, etc.) as indications for exit intent.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for providing full site personalization for an existing target website comprising:
   one or more processors and a non-transitory computer-readable storage medium including instructions that, when executed by the one or more processors, cause the one or more processors to implement:
   a) an artificial intelligence (AI) engine including one or more machine learning algorithm trained models for providing a plurality of front-end personalization features, wherein one or more front-end personalization features are selected from the plurality of front-end personalization features and wherein the one or more selected front-end personalization features are downloaded as a package to be integrated into the existing target website; and
   b) a personalization module configured for integrating the one or more selected front-end personalization features into the existing target website in a plug-and-play fashion, wherein the one or more selected front-end personalization features are integrated by i) deploying the package into the existing target website without embedding the one or more selected front-end personalization features into the existing target website individually and ii) rendering the one or more selected front-end personalization features within a popup widget, wherein the popup widget is displayed over the existing target website to provide a full site personalization without modifying a use of the existing target website underneath the popup widget.

2. The system of claim 1, wherein the popup widget is triggered upon a user input received on an element displayed on the existing target website.

3. The system of claim 2, wherein the existing target website and the one or more selected front-end personalization features are displayed on a mobile device and the element is displayed at a location reachable by a thumb of an individual while using the mobile device.

4. The system of claim 1, wherein the popup widget covers no more than 90% of a full site of the existing target website.

5. The system of claim 1, wherein at least one of the one or more selected personalization features is configured for generating recommendations personalized to an individual visitor to the existing target website.

6. The system of claim 1, wherein the one or more selected front-end personalization features comprise one or more lists of items personalized to an individual visitor to the existing target website.

7. The system of claim 1, wherein a design style of rendering the one or more selected front-end personalization features within the popup widget is customizable and is independent of a design style of the existing target website.

8. The system of claim 7, wherein the package includes the design style and is deployed without requiring setting up the existing target website or the one or more selected front-end personalization features.

9. The system of claim 7, further comprising a client portal for customizing the design-style of the popup widget.

10. The system of claim 9, wherein the client portal allows a user to modify a user action for triggering or exiting the popup widget.

11. A computer-implemented method for providing full site personalization for an existing target website comprising:
   executing, by one or more processors, instructions stored on a non-transitory computer-readable storage medium, to cause the one or more processors to perform operations comprising:
   a) providing an artificial intelligence (AI) engine including one or more machine learning algorithm trained models for providing a plurality of front-end personalization features, wherein one or more personalization features are selected from the plurality of front-end personalization features and wherein the one or more selected front-end personalization features are downloaded as a package to be integrated into the existing target website;
   b) integrating the one or more selected front-end personalization features into the existing target website in a plug-and-play fashion by deploying the package into the existing target website without embedding the one or more selected front-end personalization features into the existing target website individually; and
   rendering the one or more selected front-end personalization features within a popup widget, wherein the popup widget is displayed over the existing target website to provide a full site personalization without modifying a use of the existing target website underneath the popup widget.

12. The computer-implemented method of claim 11, wherein the popup widget is triggered upon a user input received on an element displayed on the existing target website.

13. The computer-implemented method of claim 12, wherein the existing target website and the one or more selected front-end personalization features are displayed on a mobile device and the element is displayed at a location reachable by a thumb of an individual while using the mobile device.

14. The computer-implemented method of claim 11, wherein the popup widget covers no more than 90% of a full site of the existing target website.

15. The computer-implemented method of claim 11, wherein at least one of the one or more selected front-end-personalization features is configured for generating recommendations personalized to an individual visitor to the existing target website.

16. The computer-implemented method of claim 11, wherein the one or more selected front-end personalization features comprise one or more lists of items personalized to an individual visitor to the existing target website.

17. The computer-implemented method of claim 11, wherein a design style of rendering the one or more selected front-end personalization features within the popup widget is customizable and is independent of a design style of the existing target website.

18. The computer-implemented method of claim 17, further comprising downloading the one or more selected front-end personalization features as a package and integrating the package to the target website in a plug-and-play fashion without requiring setting up the target website or the one or more selected front-end personalization features.

19. The computer-implemented method of claim 17, further comprising providing a client portal for customizing the design style of the popup widget.

20. The computer-implemented method of claim 19, further comprising receiving a user input via the client portal for modifying a user action for triggering or exiting the popup widget.

* * * * *